(12) United States Patent
Oskotsky et al.

(10) Patent No.: US 9,297,987 B2
(45) Date of Patent: Mar. 29, 2016

(54) WIDE FIELD ATHERMALIZED ORTHOSCOPIC LENS SYSTEM

(71) Applicant: BAE SYSTEMS INFORMATION AND ELECTRONIC SYSTEMS INTEGRATION INC., Nashua, NH (US)

(72) Inventors: Mark Oskotsky, Mamaroneck, NY (US); Shawn Reven, Greenlawn, NY (US); Michael J. Russo, Jr., Roslyn, NY (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 9 days.

(21) Appl. No.: 14/467,533

(22) Filed: Aug. 25, 2014

(65) Prior Publication Data

US 2014/0376106 A1 Dec. 25, 2014

Related U.S. Application Data

(63) Continuation of application No. 13/392,116, filed as application No. PCT/US2011/029615 on Mar. 23, 2011, now Pat. No. 8,817,392.

(60) Provisional application No. 61/358,024, filed on Jun. 24, 2010.

(51) Int. Cl.
    G02B 13/04    (2006.01)
    G02B 13/18    (2006.01)
    G02B 9/60     (2006.01)
    G02B 13/00    (2006.01)
    G02B 7/02     (2006.01)

(52) U.S. Cl.
    CPC .............. *G02B 13/04* (2013.01); *G02B 7/028* (2013.01); *G02B 9/60* (2013.01); *G02B 13/0045* (2013.01); *G02B 13/18* (2013.01)

(58) Field of Classification Search
    CPC ...... G02B 13/04; G02B 13/008; G02B 13/14; G02B 13/18; G02B 13/0045; G02B 13/146; G02B 9/60; G02B 9/62; G02B 9/64; G02B 7/028
    See application file for complete search history.

(56) References Cited

U.S. PATENT DOCUMENTS

| | | | |
|---|---|---|---|
| 5,621,575 A | 4/1997 | Toyama | |
| 5,668,669 A | 9/1997 | Ohtake et al. | |
| 6,377,404 B1* | 4/2002 | Goosey, Jr. | G02B 15/177 359/682 |
| 7,136,235 B2 | 11/2006 | Kirkham | |

(Continued)

FOREIGN PATENT DOCUMENTS

| | | |
|---|---|---|
| CU | 22 103 A1 | 4/1993 |
| JP | 8050238 A | 2/1996 |

*Primary Examiner* — Jordan Schwartz
(74) *Attorney, Agent, or Firm* — Dilworth & Barrese, LLP; Michael J. Musella

(57) ABSTRACT

A wide field optically athermalized orthoscopic lens system includes, in order from object to image, a first lens having a negative power, a second lens having a positive power, a third lens group having a positive power, a fourth lens having a positive power and a fifth lens having a negative power. The third lens group includes two lenses having, in order, a first lens with positive power and a second lens with negative power. The powers, shapes, Abbe dispersion values and temperature coefficients of refractive indices of the lenses are selected such that the lens system is athermalized, orthoscopic and achromatized over a wide (e.g. >140° C.) temperature range.

16 Claims, 14 Drawing Sheets

(56) References Cited

U.S. PATENT DOCUMENTS

| | | |
|---|---|---|
| 2004/0145819 A1 | 7/2004 | Wang et al. |
| 2009/0052064 A1 | 2/2009 | Caldwell |
| 2009/0303614 A1* | 12/2009 | Holota ............... G02B 13/146 359/708 |
| 2010/0246031 A1* | 9/2010 | Caldwell ............ G02B 13/00 359/797 |

* cited by examiner

| Relative Field Height | Distortion (Percent) |
|---|---|
| 0.00 | 0.00000 |
| 0.10 | -0.00016 |
| 0.20 | -0.00045 |
| 0.30 | -0.00040 |
| 0.40 | 0.00041 |
| 0.50 | 0.00208 |
| 0.60 | 0.00411 |
| 0.70 | 0.00555 |
| 0.80 | 0.00530 |
| 0.90 | 0.00325 |
| 1.00 | 0.00218 |

|       | Radius    | Thickness | Glass |
|-------|-----------|-----------|-------|
| > OBJ: | INFINITY | INFINITY  |       |
| 1:    | INFINITY  | 0.250000  | SILICA_SPECIAL |
| SLB:  | "window"  |           |       |
| 2:    | INFINITY  | 1.250000  |       |
| 3:    | INFINITY  | 0.750000  |       |
| SLB:  | "fold 1"  |           |       |
| 4:    | INFINITY  | 1.496000  |       |
| SLB:  | "fold2"   |           |       |
| 5:    | 0.89342   | 0.270000  | NPSK53A_SCHOTT |

ASP;
K : -0.544446
CUF: 0.000000
A :0.763475E-01  B :0.655184E-01  C :0.166019E-01  D :0.580360E-01

|       | Radius    | Thickness | Glass |
|-------|-----------|-----------|-------|
| 6:    | 0.72894   | 0.190311  |       |
| 7:    | 1.19335   | 0.165000  | NLAF2_SCHOTT |
| 8:    | 1.32310   | 0.173797  |       |
| STO:  | INFINITY  | 0.100000  |       |
| 10:   | 4.16235   | 0.360000  | NLAK22_SCHOTT |
| 11:   | -0.42030  | 0.124000  | KZFSN5_SCHOTT |
| 12:   | 10.62654  | 0.502390  |       |
| 13:   | 11.49979  | 0.400000  | NLAF36_SCHOTT |
| 14:   | -1.83404  | 0.824292  |       |
| 15:   | -1.47571  | 0.215000  | NLAF2_SCHOTT |
| 16:   | -15.25344 | 0.667500  |       |
| 17:   | INFINITY  | 0.080000  | 'OG-570' |
| 18:   | INFINITY  | 0.052000  |       |
| 19:   | INFINITY  | 0.040000  | SAPHIR_SPECIAL |
| 20:   | INFINITY  | 0.160500  |       |
| IMG:  | INFINITY  | -0.000000 |       |

Figure 13

PRIVATE CATALOG
| PWL | 950.00 | 800.00 | 700.00 | 600.00 | 570.00 |
|---|---|---|---|---|---|
| 'OG-570' | 1.531000 | 1.532000 | 1.535000 | 1.538000 | 1.540000 |

REFRACTIVE INDICES
| GLASS CODE | 950.00 | 850.00 | 750.00 | 650.00 | 550.00 |
|---|---|---|---|---|---|
| SAPHIR_SPECIAL | 1.756727 | 1.758929 | 1.761624 | 1.765214 | 1.770515 |
| 'OG-570' | 1.531000 | 1.531511 | 1.532898 | 1.536500 | 1.542074 |
| SILICA_SPECIAL | 1.451064 | 1.452498 | 1.454238 | 1.456538 | 1.459915 |
| NPSK53A_SCHOTT | 1.608042 | 1.609829 | 1.612110 | 1.615268 | 1.620083 |
| NLAF2_SCHOTT | 1.728002 | 1.730705 | 1.734288 | 1.739418 | 1.747502 |
| KZFSN5_SCHOTT | 1.638013 | 1.640816 | 1.644453 | 1.649587 | 1.657624 |
| NLAF35_SCHOTT | 1.781339 | 1.784423 | 1.788502 | 1.794338 | 1.803533 |
| NLAK22_SCHOTT | 1.639371 | 1.641457 | 1.644140 | 1.647879 | 1.653618 |

No solves defined in system

No pickups defined in system

This is a non-symmetric system. If elements with power are decentered or tilted, the first order properties are probably inadequate in describing the system characteristics.

INFINITE CONJUGATES
- EFL      3.2300
- BFL      0.1607
- FFL      0.4340
- FNO      7.4000
- IMG DIS  0.1605
- OAL      8.2183
- PARAXIAL IMAGE
  - HT    2.1177
  - ANG   33.2500
- ENTRANCE PUPIL
  - DIA   0.4365
  - THI   4.7719
- EXIT PUPIL
  - DIA   0.3250
  - THI   -2.2444

Figure 14

WIDE FIELD ATHERMALIZED ORTHOSCOPIC LENS SYSTEM

PRIORITY

This application is a continuation of U.S. patent application Ser. No. 13/392,116, filed Feb. 24, 2012, now allowed, which is a national stage filing of International Application No. PCT/US2011/029615, filed Mar. 23, 2011, which claims the benefit of U.S. Provisional Application No. 61/358,024, filed Jun. 24, 2010, the contents of each of which are incorporated herein by reference.

BACKGROUND OF THE INVENTION

1. Field of the Invention

The present invention relates to optics. More particularly, this invention relates to athermalized and orthoscopic lens systems. Still more particularly the invention relates to a wide angle lens system, color and distortion corrected over the visible spectrum and athermalized over a wide (e.g. −60° C. to 80° C.) temperature range.

This lens is suitable for, but not limited to, visible and near infrared airborne sensor systems where athermalized, achromatized and orthoscopic performance is essential for high resolution target imaging.

2. Brief Description of Related Art

U.S. Pat. No. 5,691,847 discloses an athermalized and achromatized optical system employing a diffractive optical element. This lens includes a refractive lens group and diffractive optical element. The refractive group consists of elements of at least two different materials for thermal compensation and a diffractive optical element which is used for chromatic aberration correction. This lens is used in the infrared spectrum and the claimed relations between the lens parameters can not be utilized in the visible spectrum. This lens is also not orthoscopic and has a modest field of view. The diffractive element also introduces stray light which may not be acceptable in some applications.

Another example of a wide field lens is disclosed in U.S. Pat. No. 6,023,375. This projection lens is used to form an image of a pixelized panel (for example LCD) on a screen and possesses the following properties: long focal length, magnification adjustment, relatively small size and relatively low distortion (~1% or about 100 microns). The lens consists of components with positive and negative optical powers with certain lens elements having weak or strong optical powers. In order to address the temperature sensitivity problem and weight issues the lens utilizes both glass and plastic materials. For distortion and field curvature correction a negative optical power field lens is used. The lens is not completely athermal through a large temperature range and residual distortion is large enough to prevent usage of this lens as a high performance orthoscopic lens system where distortion is required to be less than 0.04%.

Another athermalized lens is disclosed in U.S. Pat. No. 6,999,243. This lens combines refractive and diffractive optical surfaces with special relations between elements optical powers; also materials which are transmissive in IR spectrum are utilized. This configuration is not suitable for the lenses working in visible spectrum, the field of view is relatively small and diffractive surfaces may introduce scattered light glare which reduces contrast at the image plane.

Yet another wide field of view projection lens is described in U.S. Pat. No. RE 39,911. This lens has a wide field of view of at least 35°, utilizes an aspherical surface at the first element for distortion correction and spherical surfaces for aberrational correction. However this lens is not free from the performance drawbacks described above. The residual distortion is nearly 1% and spherochromatism exceeds 10 microns.

Yet another imaging wide field of view lens is described in U.S. Pat. No. 7,405,890. This lens operates over the visible and near infrared spectrums, is compact and provides a wide field of view. However this lens is not athermalized and is not orthoscopic. Residual distortion exceeds 2-3% and spherochromatism is 20-30 microns.

SUMMARY OF THE INVENTION

Accordingly, the present invention has been made to solve at least the above-mentioned problems occurring in the prior art, and an object of the present invention is to provide a wide field athermalized orthoscopic lens system.

In one embodiment, in accordance with the principles of the present disclosure, a wide field athermalized orthoscopic lens system is provided. The wide field athermalized orthoscopic lens system includes first optical group having a negative optical power; a second optical group having a positive optical power; a third optical group having a positive optical power; a fourth optical group having a positive optical power and a fifth optical group having a negative optical power and the first, the second, the third, the fourth and the fifth optical groups are positioned in the stated order from the object to the image plane.

The first optical group represents one optical element with a negative optical power; and the first optical group is arranged to diverge light received from the object and to direct the diverged light onto the second optical group. The second optical group represents one optical element with a positive optical power; and the second optical group is arranged to converge the light from the first optical group and to direct the converged light onto the third optical group. The third optical group includes two optical elements having in order from the object a positive and a negative optical power, and is arranged to converge the light from the second optical group and to direct it onto the fourth optical group. The fourth optical group represents one optical element with a positive optical power and is arranged to further converge the light from the third optical group to the fifth optical group. The fifth optical group represents one optical element with a negative optical power and directs the light from the fourth optical group onto the image plane. The optical powers and shape of the components, Abbe dispersion values and temperature changes of the optical materials refractive coefficients are selected that the lens system is athermalized over the wide range of temperatures. The lens system is orthoscopic and chromatic aberration is corrected.

BRIEF DESCRIPTION OF THE DRAWINGS

The above and other objects, features and advantages of the present invention will be more apparent from the following detailed description taken in conjunction with the accompanying drawings, in which:

FIGS. 13 and 14 are a wide field athermalized orthoscopic lens system prescription according to an embodiment of the present invention.

Like reference numerals indicate similar parts throughout the figures.

DETAILED DESCRIPTION OF THE INVENTION

Figure 1:
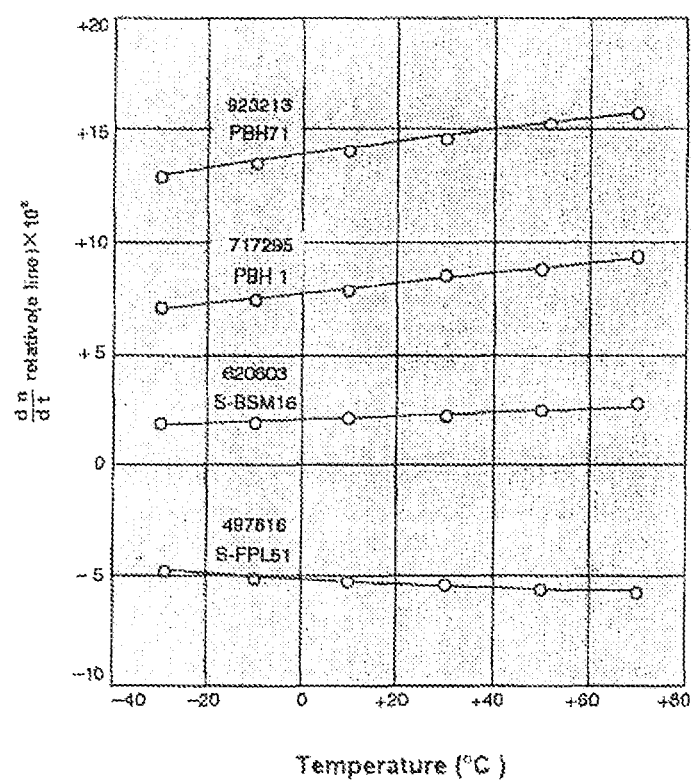
FIG. 1 is a graph showing changes in the relative refractive index depending on temperature according to an embodiment of the present invention.
Figure 2:
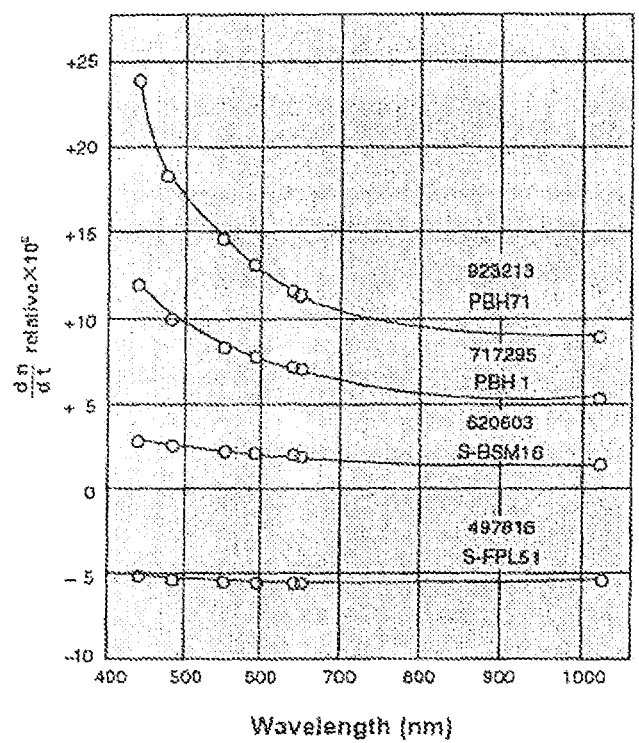
FIG. 2 is a graph showing the dependence of the relative refractive index change with temperature on wavelengths for different types of glass according to an embodiment of the present invention.

A preferred embodiment of the present invention will be described in detail with reference to the accompanying drawings. Note that the same or similar components in drawings are designated by the same reference numerals as far as possible although they are shown in different drawings. In the following description of the present invention, a detailed description of known functions and configurations incorporated herein will be omitted when it may make the subject matter of the present invention rather unclear.

The present invention may be understood more readily by reference to the following detailed description of the invention taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. Also, as used in the specification and including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

The following discussion includes a description of a wide field athermalized orthoscopic lens system in accordance with the principles of the present disclosure. Alternate embodiments are also disclosed. Reference will now be made in detail to the exemplary embodiments of the present disclosure, which are illustrated in the accompanying figures. Turning now to FIGS. 1-14, there are illustrated a wide field athermalized orthoscopic lens system in accordance with the principles of the present disclosure.

A need exists in the art for a wide field athermalized orthoscopic lens system for use in airborne scanning remote sensors. A wide field athermalized orthoscopic lens system for use in this application must meet the following standards:
1. orthoscopic or have distortion correction better than 0.04% across the field;
2. completely athermalized (thermal image shift shall be less than depth of focus);
3. wide field of view, exceeding 60 degrees; and
4. achromatized over the spectrum to less than one pixel (<10 microns).

The property of orthoscopy provides a true undistorted image of the target and simplifies the scanning process because the variation of focal length across the field is minimized.

Temperature change that occur in these types of applications will cause the following effects:
1. surface radii change;
2. changing a spherical surface to an aspheric surface;
3. change in the spacing between lenses; and
4. change of the refractive indices of the optics.

The magnitude of temperature effects are controlled by coefficients α and β. α is the linear coefficient of thermal expansion (CTE) and is defined as:

$$\alpha = 1/L\left(\frac{dL}{dT}\right) \quad (1)$$

β is the thermal coefficient of refractive index and is defined as:

$$\beta = \frac{dN}{dT} \quad (2)$$

where L is the original element thickness, N is the optical material refractive index at normal (usually +20° C.) temperature, T is the original temperature.

The magnitude of these coefficients determines the sensitivity of the optical system to a change in temperature. Different material types have different γ coefficients, and result in different performance impacts.

Athermalized systems have a very low sensitivity to temperature changes and their performance does not change with temperature. The allowable change of the focal length should lie within the depth of focus of the optical system.

Athermalization is accomplished by careful selection of the lens element optical materials. Lens elements have to be combined in a way to make the lens insensitive to a change in temperature. No moving parts are thus employed, but very careful attention needs to be paid to the selection of the types of glass used and the material used to manufacture the mechanical spacers. The impact of athermalization is based on the type of lens optical material and mechanical spacers material that are used.

To reduce the thermal sensitivity demonstrated by Equations (1) and (2), the necessary and optimal combination of different materials with special relations between their material expansion coefficients and refractive indices must be determined. Some glasses (e.g. fluor crown (FK) and phosphate crown (PK) glass from Schott and Ohara) have been specifically manufactured to have small or negative γ values to address this problem.

The refractive index may be absolute if related to vacuum media or relative if related to ambient air. Changes in the relative refractive index $n_e$ as a function of temperature (at wave length 546.074 nm) for Ohara glass is illustrated in FIG. 1.

The refractive index change is not uniform across the spectrum and depends on the wavelength. The dependence of the relative refractive index change with temperature on wavelengths for different glasses in illustrated in FIG. 2.

Chromatic dispersion in a given glass material occurs because the index of refraction (n) of the material varies with the wavelength of light transmitted through the material. The degree of this variation is represented by the so-called Abbe value ($V_d$) for a given type of glass. Specifically, $$V_e = (n_e - 1)/(n_{F'} - n_{C'}) \quad (3)$$

where $n_e$ is the index of refraction of the glass at the wavelength of the green mercury line e (546.074 nm), $n_{F'}$ is the index at the blue cadmium line F' (479.99 nm), and $n_{C'}$ is the index at the red cadmium line C' (643.85 nm). Accordingly, the smaller the value of $V_e$, the greater the chromatic dispersion through the glass.

Chromatic correction should be obtained for at least two wavelengths wherein the focal lengths for the two wavelengths are substantially identical. Chromatic correction is needed to achieve good optical performance across the whole spectrum of interest, i.e., the more wavelengths having the same focal length, the better. Chromatic correction requires glasses with special dispersive properties over the entire spectrum of interest. At the same time, the optical powers of the lens elements need to be arranged in a certain order depending on the dispersive properties of the elements.

Figure 3:
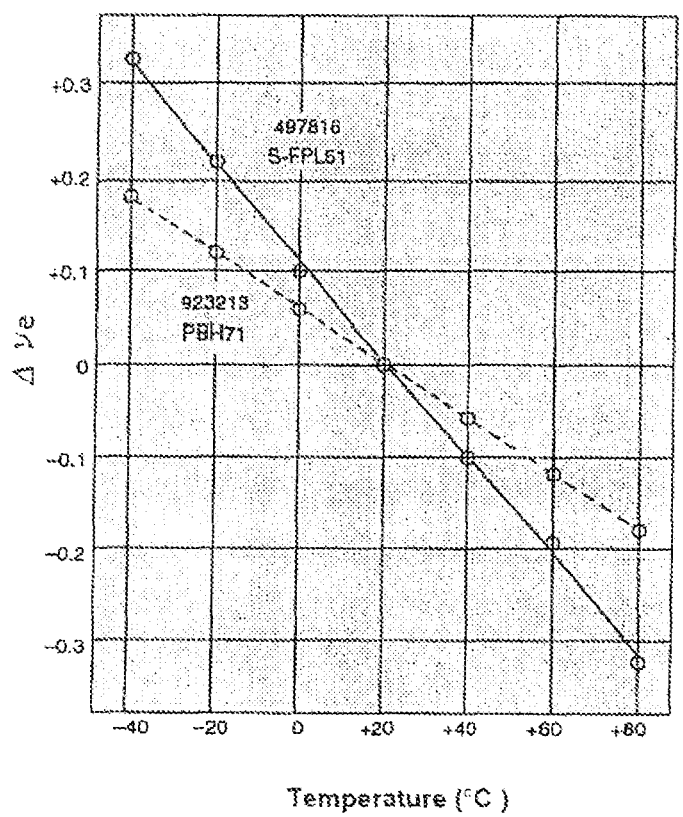
FIG. 3 is a graph showing the dependence of glass dispersion on temperature according to an embodiment of the present invention.

Dispersion of glasses changes with temperature variation, so chromatic correction of the original system may be destroyed. The dependence of dispersion $V_e$ on temperature is illustrated in FIG. 3.

For the athermal and chromatically corrected lens, the focal length change and all monochromatic and chromatic aberrations changes are the functions of:
1. lens material properties such as temperature change of index and dispersion; and
2. temperature expansion coefficients of glasses and spacers.

The index change has the most significant effect on lens performance.

There is an increasing demand for the remote airborne optical sensors that are used across a wide range of temperatures in military and civilian applications. These sensors require athermalized and orthoscopic wide angle lenses that sustain optical performance through the wide visible spectrum and large range of temperatures. The range of temperature is usually from −20° C. to 50° C. and within this range residual distortion should be less than 0.04%. The change of the focal length through the temperature range should be less than the depth of focus of the lens. The existing lenses are not athermalized through the wide range of temperatures and the change of the focal length exceeds depth of the focus. This causes a performance change and degradation through the required range of temperatures, especially for the wide field of view lenses. Also the existing lenses are not orthoscopic and their residual distortion is not less than 1%, so the precise measurements of the target characteristics and location cannot be measured without significant post processing of the image.

In an embodiment of the present invention, a wide angle orthoscopic lens system is athermalized and sustains its performance through a wide range of temperatures. The lens system is corrected for monochromatic and chromatic aberrations for the visible spectrum of 550 nm-950 nm. The lens system is orthoscopic with residual distortion across the field of 66.5° not exceeding 0.021%.

Figure 4:
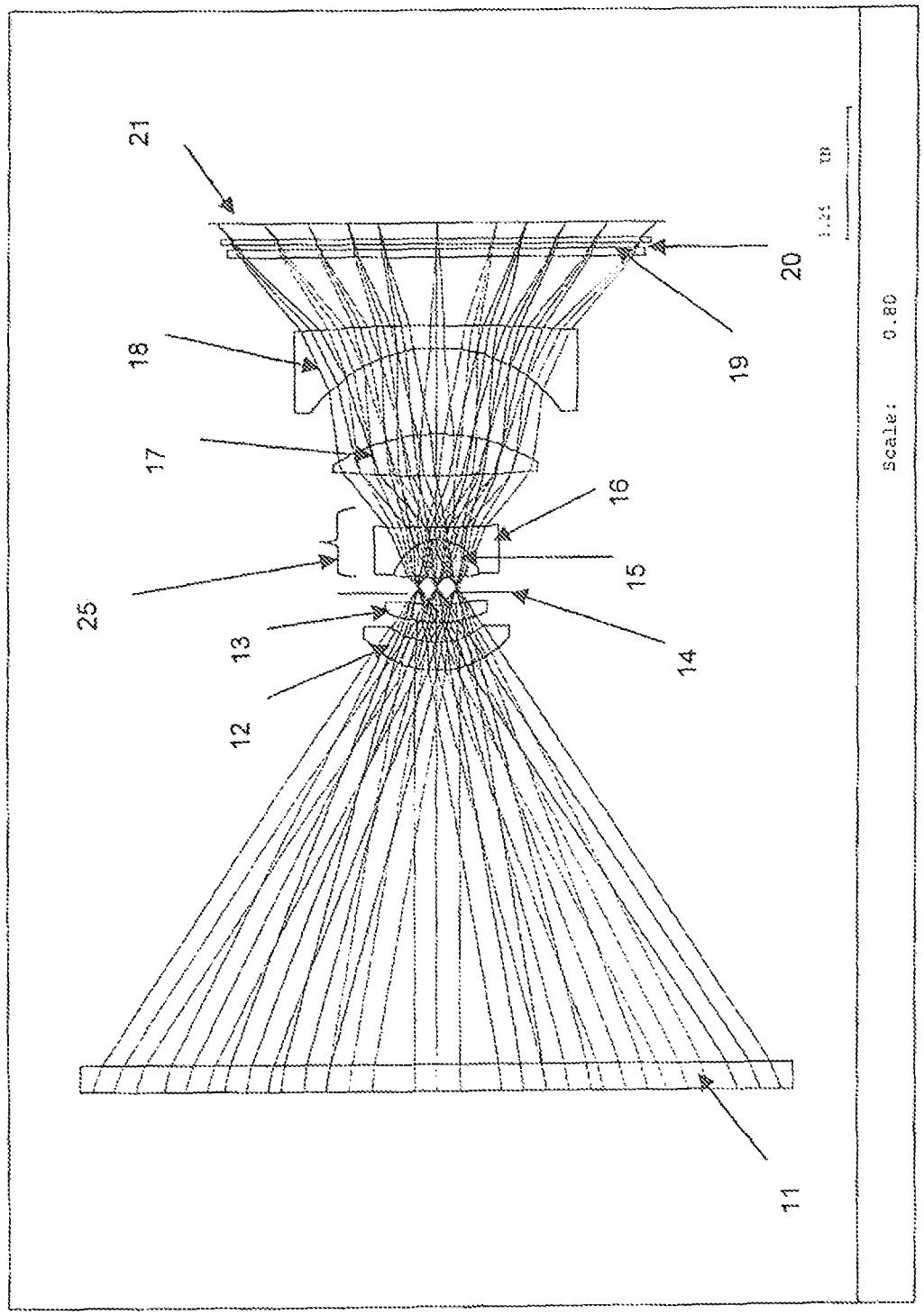
FIG. 4 shows the wide field athermalized orthoscopic lens system according to an embodiment of the present invention.

FIG. 4 shows the wide field athermalized orthoscopic lens system according to an embodiment of the present invention. The lens includes a first optical group 12, a second optical group 13, a third optical group 25, a fourth optical group 17, and a fifth optical group 18. There is an entrance window 11 before the lens, filter 19, window 20 and image plane 21 after the lens. All lens groups are mounted in the stated order from the object space to the image plane, left to right. A first optical 12 group consists of a single optical element that has a negative optical power and is configured to diverge the light coming from the object and direct it onto the second optical group 13. The second optical group 13 consists of a single optical element that has a positive optical power and is configured to converge the light and to direct it onto the third optical group 25. The third optical group 25 consists of two optical elements 15 and 16 representing a doublet that has a positive optical power and is configured to further converge the light and to direct it onto the fourth optical group 17. The fourth optical group 17 consists of a single optical element that has a positive optical power and is configured to further converge the light and to direct it onto the fifth optical group 18. The fifth optical group 18 consists of a single optical element that has a negative optical power and is configured to diverge the light and to direct it onto the image plane 21. An aperture stop 14 is located between the second optical group 13 and the third optical group 25.

In order to develop a wide field of view while correcting monochromatic aberrations the following relationships between the optical powers of optical groups have been found:

$$-0.26 < \Phi_1/\Phi < -0.14$$

$$0.22 < \Phi_2/\Phi < 0.38$$

$$0.85 < \Phi_2/\Phi_3 < 1.25$$

$$1.45 < \Phi_4/\Phi < 1.85$$

$$0.65 < \Phi_5/\Phi_4 < 1.05$$

where $\Phi$ is the optical power of the lens; and, $\Phi_1$, $\Phi_2$, $\Phi_3$, $\Phi_4$ and $\Phi_5$ are the optical powers of the first, second, third, fourth and fifth optical groups, respectively. These relationships allow for the correction of astigmatism and image curvature over the wide field of view.

In order to correct for the spherical aberration and coma across the wide field of view the first surface of the first optical group 12 optical element represents a general asphere.

In order to correct for the chromatic aberration, five optical materials (glasses) have to be utilized in the lens and the following relationships between the Abbe values of the optical glasses used by the lens have to be maintained:

$$1.30 < V_1/V_2 < 1.55$$

$$1.35 < V_{31}/V_{32} < 1.55$$

$$0.80 < V_4/V_5 < 1.20$$

where $V_1$, $V_2$, $V_4$ and $V_5$ are the Abbe values for the first, second fourth and fifth optical groups, $V_{31}$ and $V_{32}$ are the Abbe values for the first and second elements of the third optical group. These relationships allow for the correction of the chromatic aberration over the wide spectrum of 550 nm to 950 nm.

In order to athermalize the lens across the wide range of temperatures, the following relationships between the temperature coefficients of the refractive indices of the optical materials used in the lens have been obtained:

$$-2.60 < (dn/dT)_1 / (dn/dT)_2 < -2.25$$

$$0.45 < (dn/dT)_{31} / (dn/dT)_{32} < 0.65$$

$$8 < (dn/dT)_4 / (dn/dT)_5 < 10$$

where $(dn/dT)_1$, $(dn/dT)_2$, $(dn/dT)_4$ and $(dn/dT)_5$ are temperature change in refractive indices for the first, second, fourth and fifth groups; and, $(dn/dT)_{31}$, $(dn/dT)_{32}$ are temperature change in refractive indices for the first and second elements of the third optical group. These relationships provide a thermally stable lens with an extremely low change of the focal length over the wide range of temperatures.

The orthoscopy or distortion correction over the wide field of view, taking into account the existing set of the optical groups optical powers, are provided by the following:
1. the optical element of the first optical group represents a negative optical power meniscus lens bent towards the object;
2. the optical element of the second optical group represents a positive optical power meniscus bent towards the object;
3. the first optical element of the third optical group has a positive optical power and is double convex and the second optical element of the third optical group has a negative optical power and is double concave;
4. the optical element of the fourth optical group has a positive optical power and is double convex; and
5. the optical element of the fifth optical group represents negative meniscus bent towards the image plane.

With this configuration the mutual distortion compensation exists, for example distortion induced by the first surfaces of the optical elements of the first and second optical groups is compensated by the distortion induced by the last surfaces of the optical elements of the first and second optical groups, distortion induced by the last surface of the second element of the third optical group compensates distortion induced by the first surface of the first optical element of the third optical group, distortion induced by the first surface of the optical element of the fourth optical group is compensated by the distortion induced by the optical element of the fifth optical group. In this case, distortion may be virtually a zero over the wide field of view.

The first optical element and the second optical element of the third optical group are cemented in order to eliminate the high order coma.

In order to have the lens athermalized inside the mechanical housing the following relationships have to be met:

$$1.05 < \alpha_1/\alpha_2 < 1.40$$

$$1.35 < \alpha_{31}/\alpha_{32} < 1.60$$

$$0.50 < \alpha_4/\alpha_5 < 0.80$$

$$0.75 < A/\alpha_s < 1.25$$

where A is the mean value of thermal expansion coefficients of glasses used in the lens, and $$A = (\alpha_1 + \alpha_2 + \alpha_3 + \alpha_4 + \alpha_5)/5; \quad (4)$$

where $\alpha_1$ is the thermal expansion coefficient of the first optical group element, $\alpha_2$ is the thermal expansion coefficient of the second optical group element, $\alpha_3 = \alpha_{31} + \alpha_{32}$, $\alpha_{31}$ is the thermal expansion coefficient of the first element of the third optical group, $\alpha_{32}$ is the thermal expansion coefficient of the second element of the third optical group, $\alpha_4$ is the thermal expansion coefficient of the fourth optical group element, $\alpha_5$ is the thermal expansion coefficient of the fifth optical group element, and $\alpha_s$ is the thermal expansion coefficient of the mechanical spacers material between the optical groups and between the fifth element and the image plane.

Figure 5:
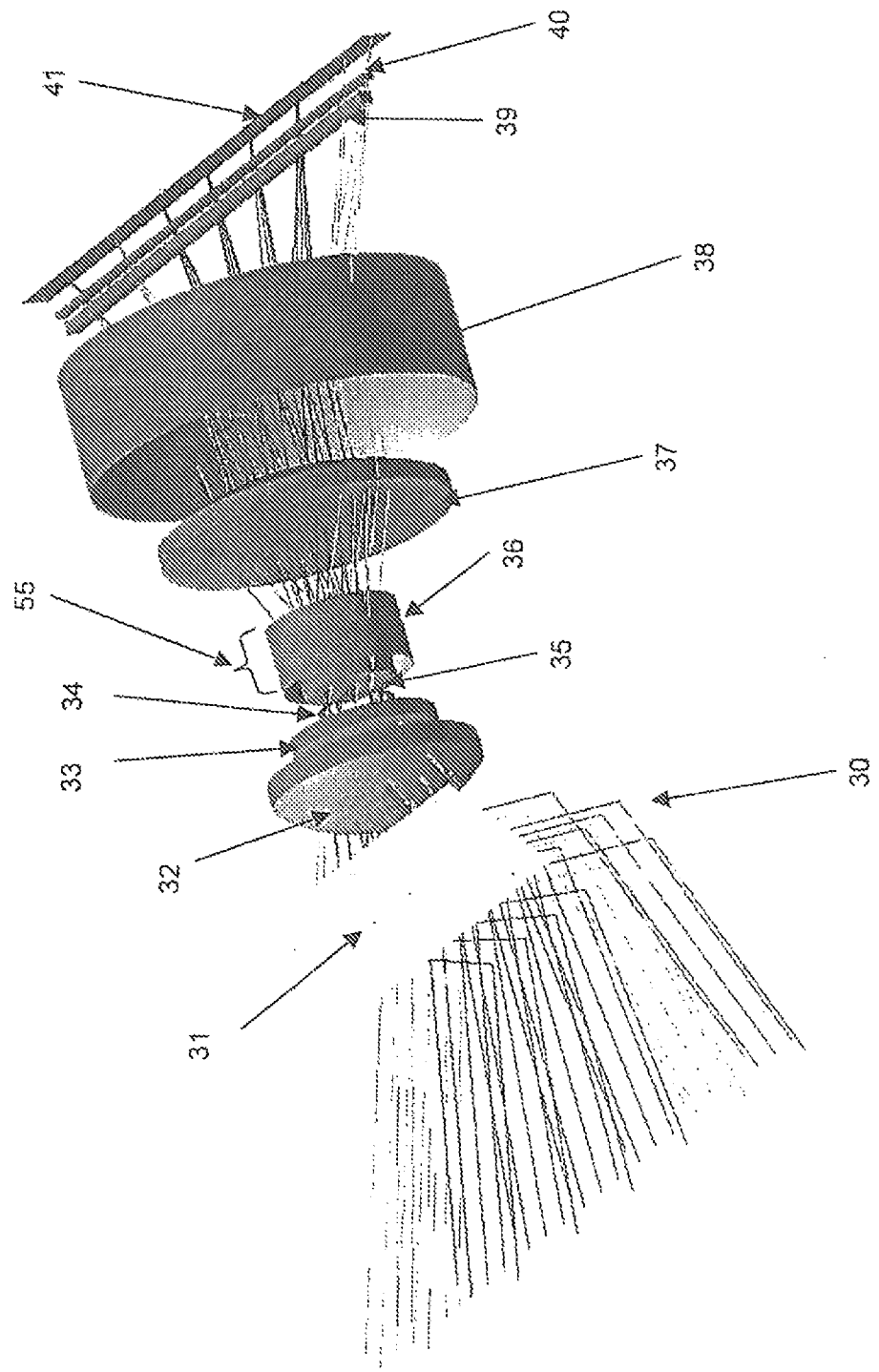
FIG. 5 is a perspective view of the wide field athermalized orthoscopic lens system in 3-dimensional space.

FIG. 5 is a perspective view of the wide field athermalized orthoscopic lens system in 3-dimensional space when mounted on an airborne sensor. Light in the spectrum of 550 nm-950 nm emitted by the target is reflected from the scanning mirror 30 and fold mirror 31. This reflected light then goes through the negative optical power first group 32, positive optical power second group 33, positive optical power third group 55 (which consists of positive optical power element 35 and negative optical power element 36), positive optical power fourth group 37, and negative optical power fifth group 38. The light then passes through optical filter 39 and window 40, and is focused onto the focal plane 41. Aperture stop 34 is located between the second optical group 33 and the third optical group 55. The focal plane 41 may be a focal plane array or CCD.

Figure 6:
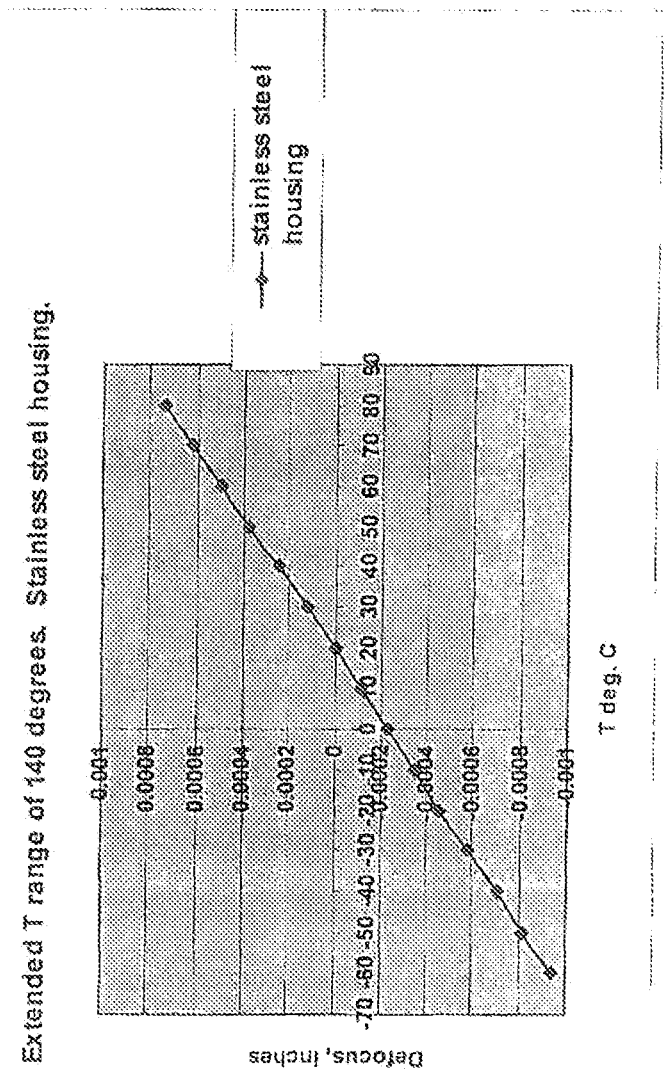
FIG. 6 is a graph of the focal length variation through the range of temperatures of the wide field athermalized orthoscopic lens system according to an embodiment of the present invention.

FIG. 6 is a graph of the focal length variation through the range of temperatures of the wide field athermalized orthoscopic lens system according to an embodiment of the present invention. FIG. 6 shows the changes of the wide field athermalized orthoscopic lens system focal length over a wide temperature range of 140° C. Stainless steel spacers are utilized between the optical groups of the elements and between the fifth element and the image plane. The change of the focal length does not exceed 0.002 of an inch, which is within the depth of focus. The lens is athermalized.

Figure 7:
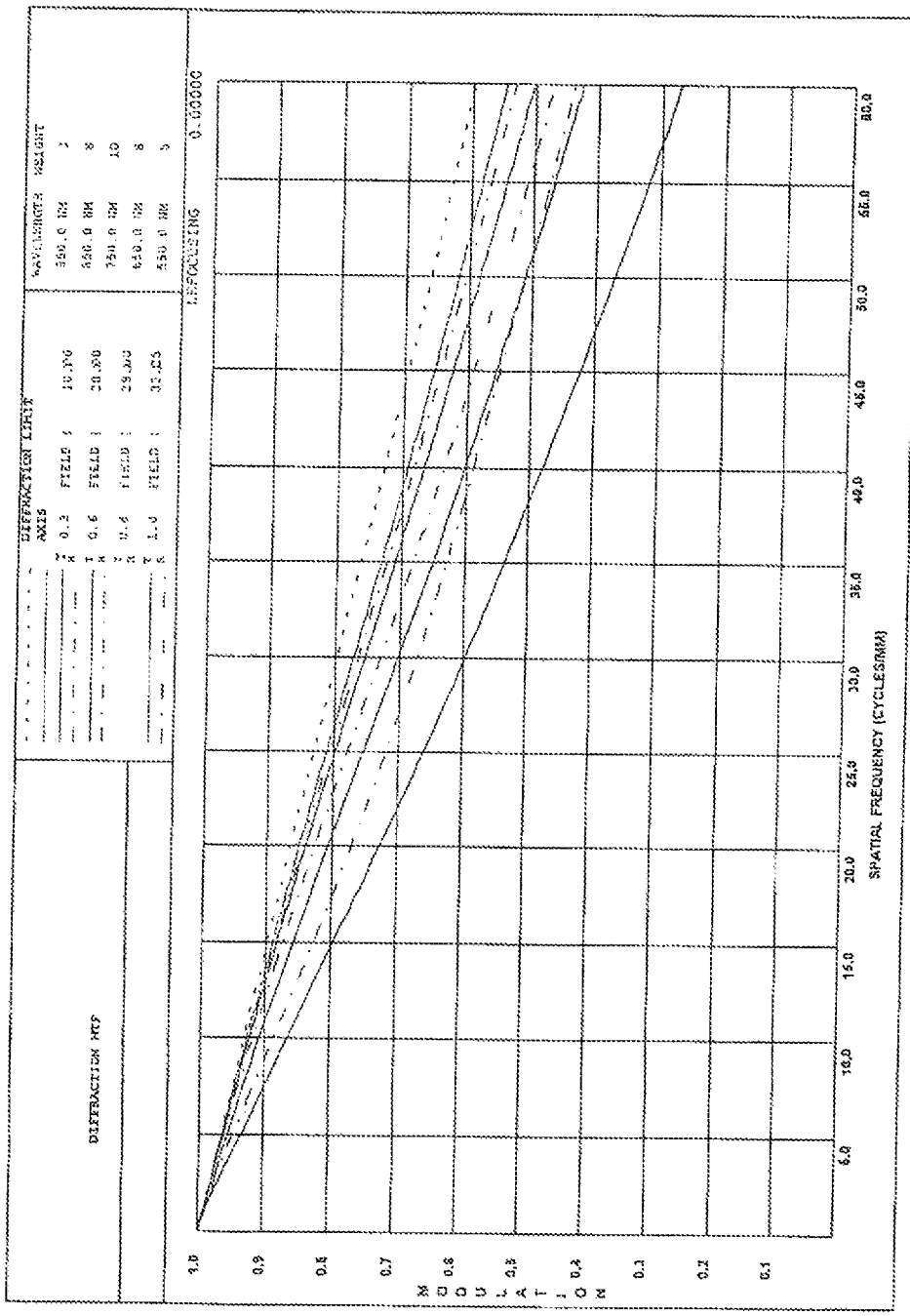
FIG. 7 is a graph of the wide field athermalized orthoscopic lens system modulation transfer function (MTF) at +20° C.
Figure 8:
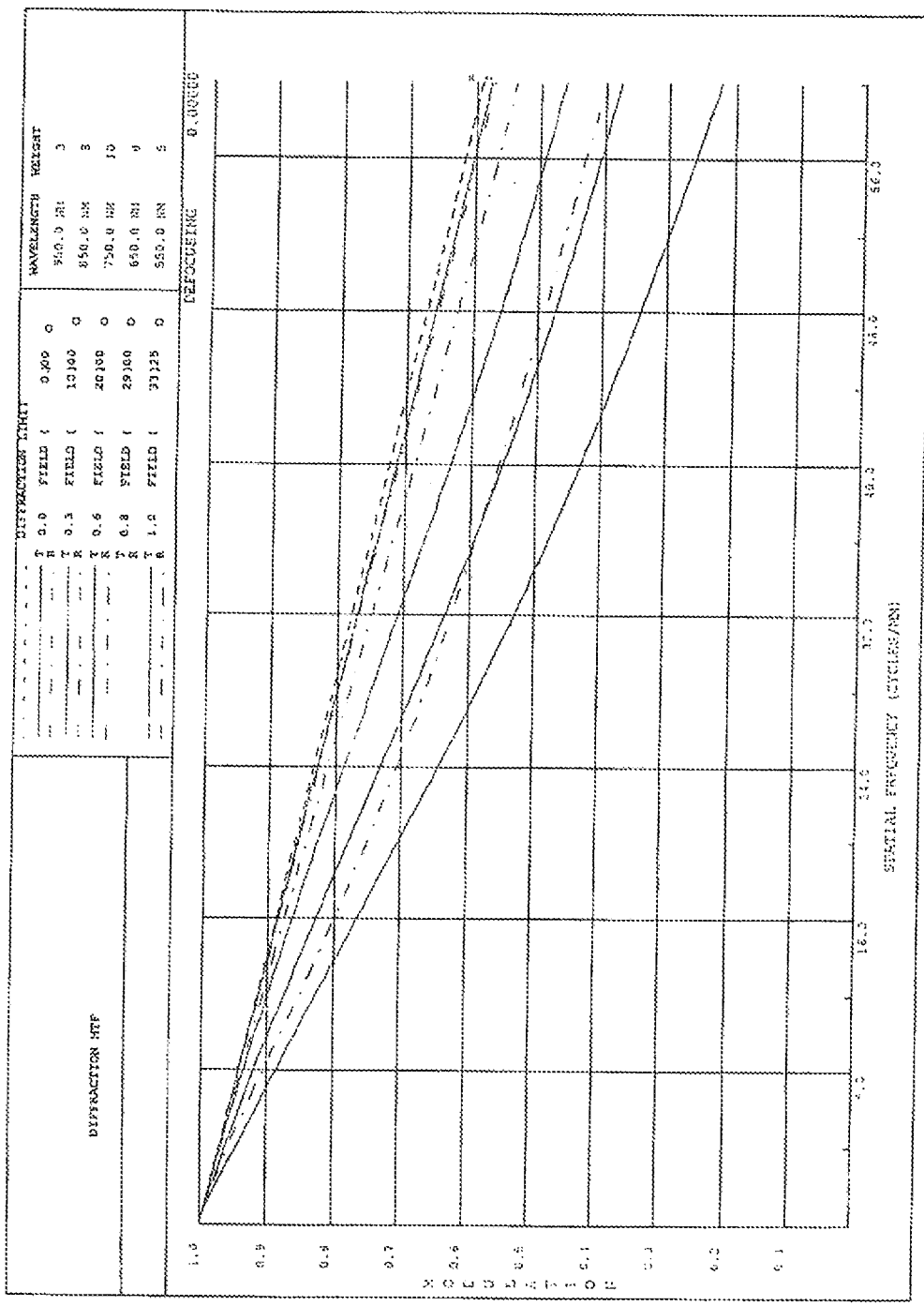
FIG. 8 is a graph of the wide field athermalized orthoscopic lens system MTF at −20° C.
Figure 9:
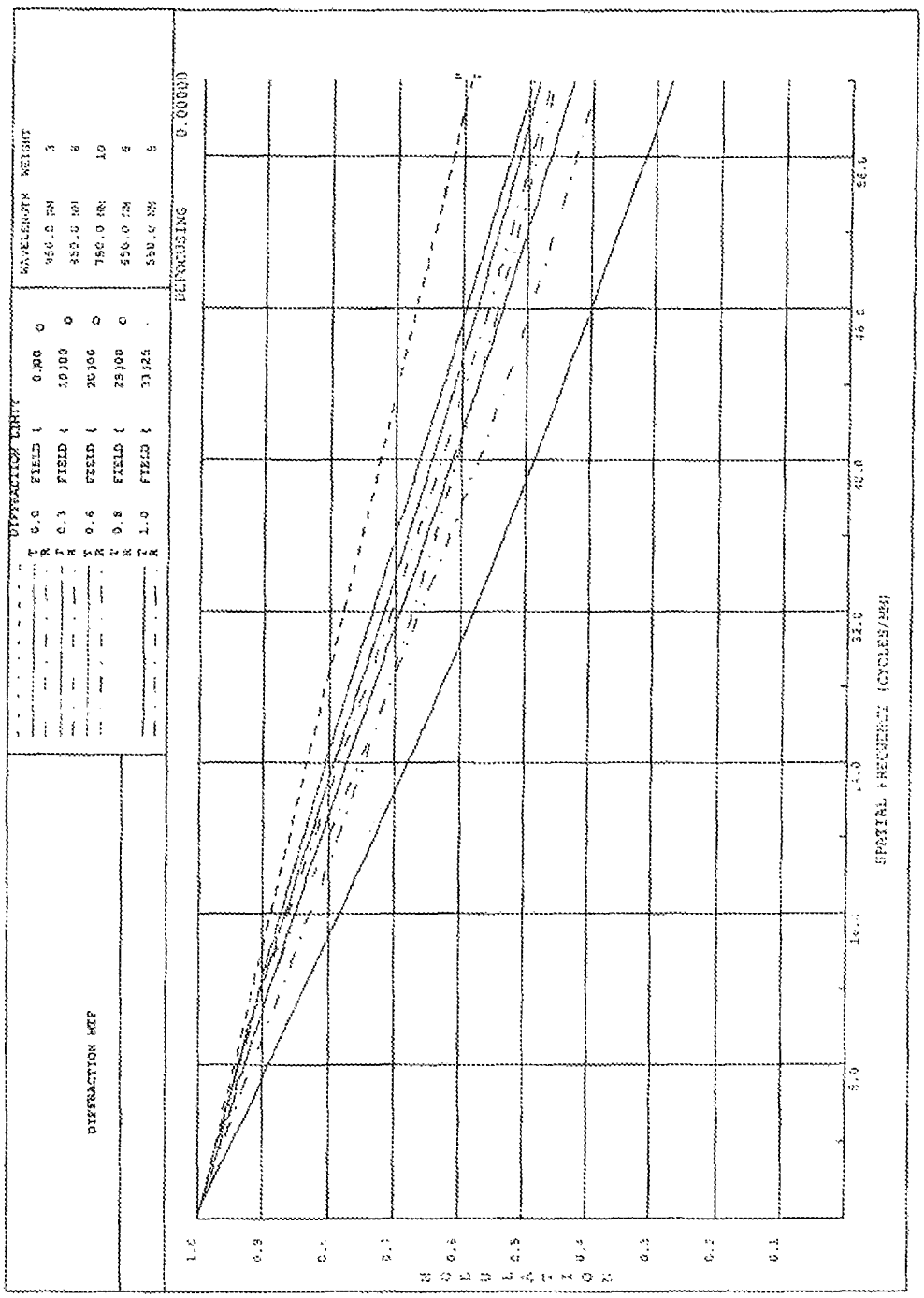
FIG. 9 is a graph of the wide field athermalized orthoscopic lens system MTF at +50° C.

FIG. 7, FIG. 8 and FIG. 9 show modulation transfer functions (MTF) of the wide field athermalized orthoscopic lens system up to the Nyquist frequency of 60 cycles/mm at +20° C., −20° C. and +50° C., respectively. MTF change is negligible through the temperature range of 70° C.

Figure 10:
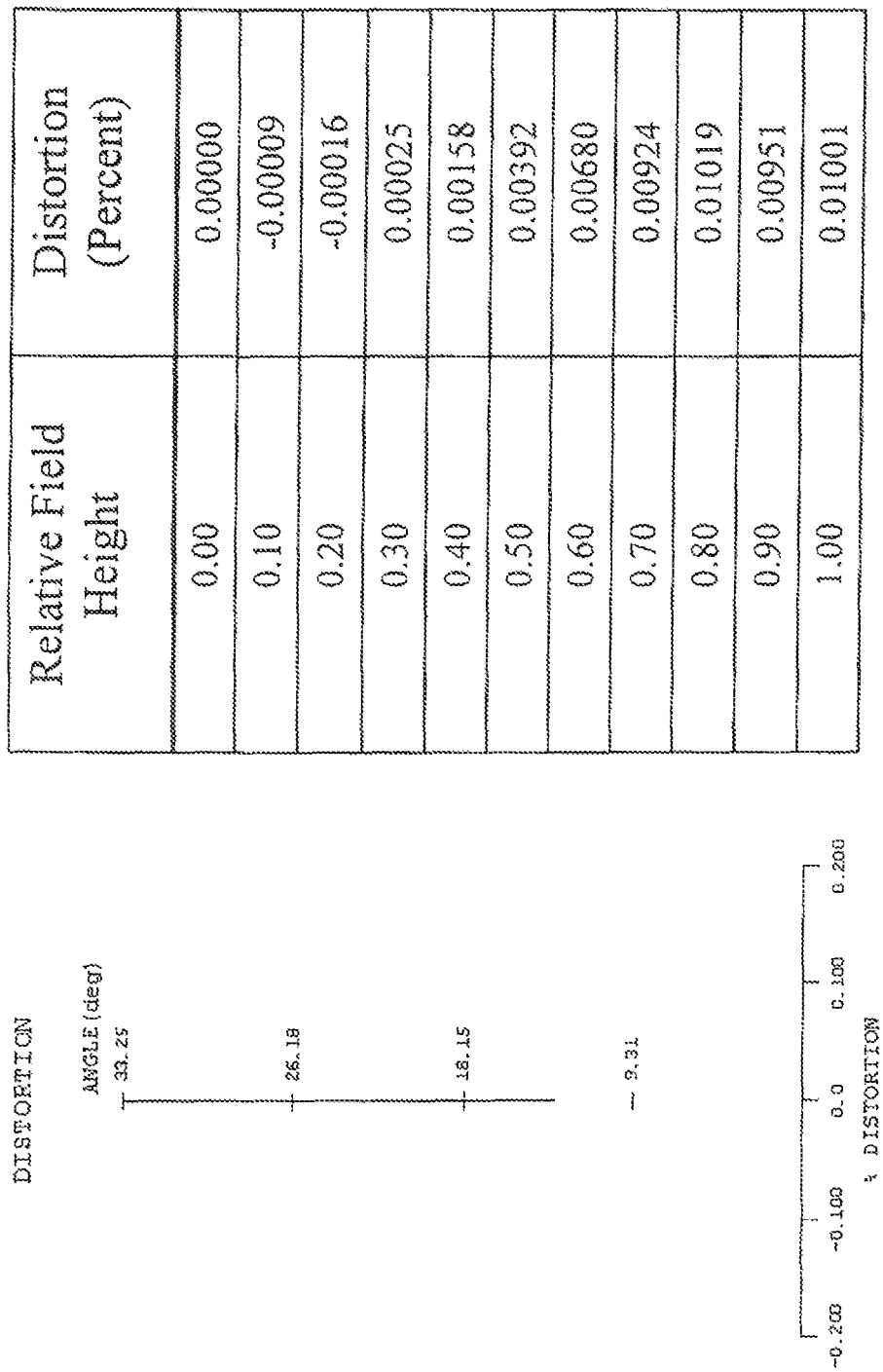
FIG. 10 is a graph of the wide field athermalized orthoscopic lens system distortion at +20° C.
Figure 11:
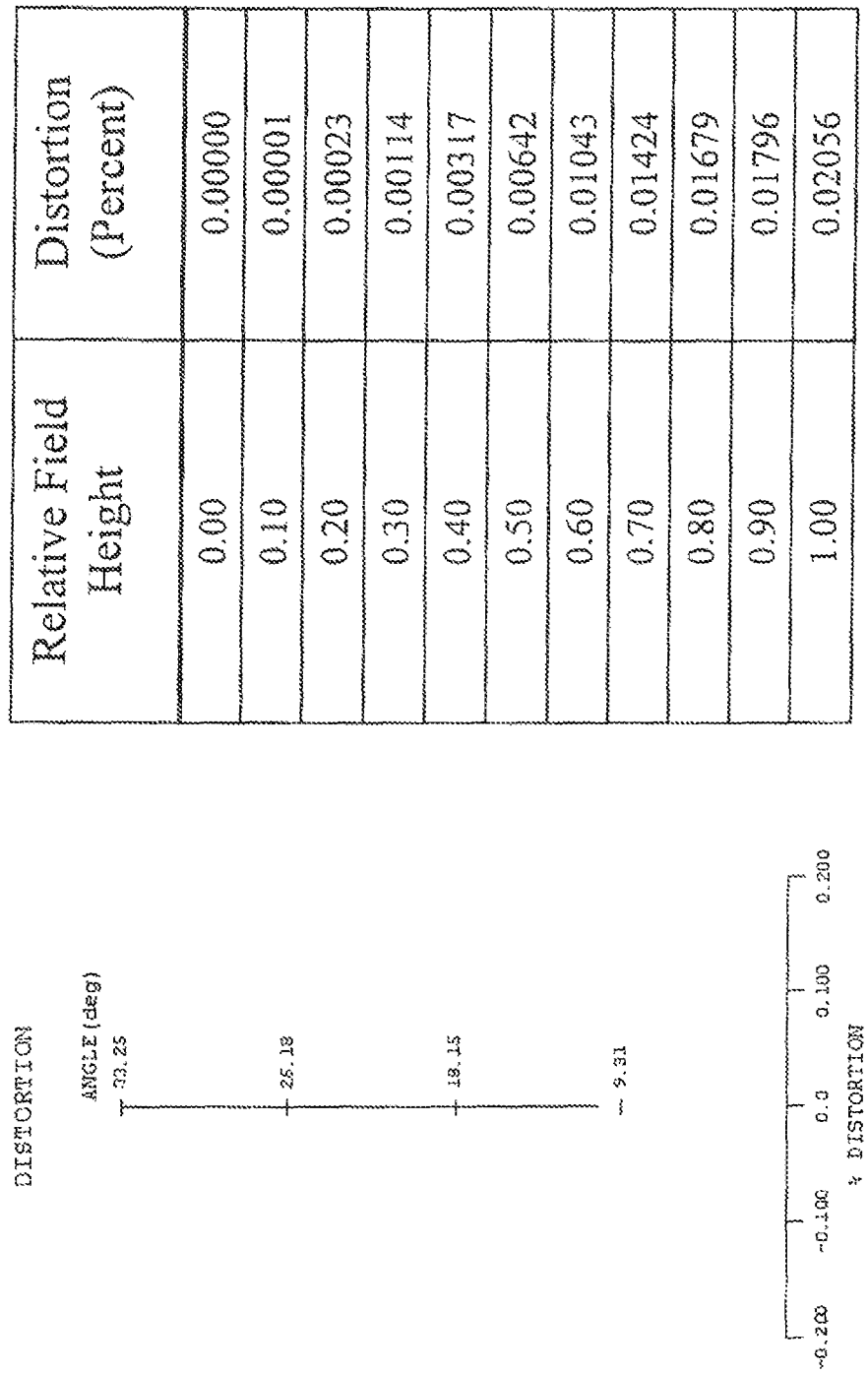
FIG. 11 is a graph of the wide field athermalized orthoscopic lens system distortion at −20° C.
Figure 12:
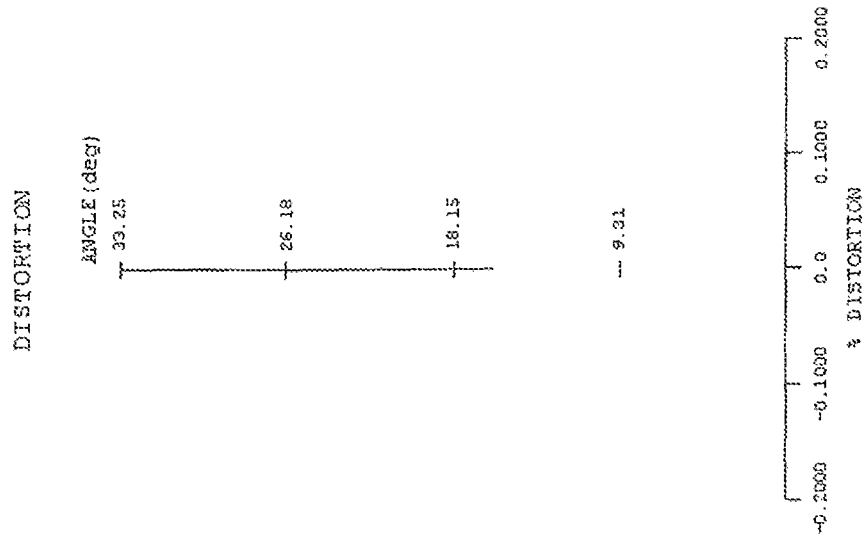
FIG. 12 is a graph of the wide field athermalized orthoscopic lens system distortion at +50° C.

FIG. 10, FIG. 11 and FIG. 12 show the relative distortion of the wide field athermalized orthoscopic lens system for the field of view of 66.5° at +20° C., −20° C. and +50° C., respectively. The lens is orthoscopic and residual distortion does not exceed 0.021% through the range of temperatures of 70° C.

FIGS. 13 and 14 show the prescription properties of the optical elements of the wide field athermalized orthoscopic lens system.

While the present invention has been described in connection with the preferred embodiments of the various figures, it is to be understood that other similar embodiments may be used or modifications or additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:
1. A wide field athermalized orthoscopic lens system, in order from the object plane to the image plane, comprising:
   a first optical group having a negative optical power, including exactly one optical lens element;
   a second optical group having a positive optical power and including exactly one optical lens element;

a third optical group having a positive optical power and including exactly one cemented lens doublet;
an aperture located between the second and third optical groups;
a fourth optical group having a positive optical power, and including exactly one optical lens element; and
a fifth optical group having a negative optical power and including exactly one optical lens element,
wherein the lens system has a full field of view of 66.5°,
wherein the lens system is athermalized over the range of at least −60° C. to 80° C.,
wherein the lens system being apochromatic over a spectral range of 950 nm to 550 nm, and
wherein distortion of the lens system does not exceed 0.021% over the full field of view of 66.5°.

2. The lens system of claim 1, wherein:
the first optical group is arranged to diverge light received from the object and to direct the diverged light onto the second optical group;
the second optical group is arranged to converge the light from the first optical group and to direct the converged light onto the third optical group;
the third optical group is arranged to converge the light from the second optical group and to direct the converged light onto the fourth optical group;
the fourth optical group is arranged to further converge the light from the third optical group and to direct the further converged light onto the fifth optical group;
the fifth optical group is arranged to focus the light onto the image plane;
optical powers of the lens system components, satisfy the relations:

$$-0.26 < \Phi_1/\Phi < -0.14,$$

$$0.22 < \Phi_2/\Phi < 0.38,$$

$$0.85 < \Phi_2/\Phi_3 < 1.25,$$

$$1.45 < \Phi_4/\Phi < 1.85,$$

$$0.65 < \Phi_5/\Phi_4 < 1.05,$$

where $\Phi$ is the optical power of the lens system, $\Phi_1$, $\Phi_2$, $\Phi_3$, $\Phi_4$ and $\Phi_5$ are the optical powers of the first, second, third, fourth and fifth optical groups respectively,
the Abbe numbers of the optical groups satisfy the relations:

$$1.30 < V_1/V_2 < 1.55,$$

$$1.35 < V_{31}/V_{32} < 1.55,$$

$$0.80 < V_4/V_5 < 1.20,$$

where $V_1$, $V_2$, $V_4$ and $V_5$ are Abbe values for the first, second, fourth and fifth optical groups respectively, $V_{31}$ and $V_{32}$ are the Abbe values for the first and second lens elements of the third optical group respectively, and
the optical groups refractive index changes with temperature satisfy the relations:

$$-2.60 < (dn/dT)_1/(dn/dT)_2 < -2.25,$$

$$0.45 < (dn/dT)_{31}/(dn/dT)_{32} < 0.65, \text{ and}$$

$$8 < (dn/dT)_4/(dn/dT)_5 < 10,$$

where $(dn/dT)_1$, $(dn/dT)_2$, $(dn/dT)_4$ and $(dn/dT)_5$ are temperature change in refractive indices for the first, second, fourth and fifth optical groups, respectively, and $(dn/dT)_{31}$, $(dn/dT)_{32}$ are temperature change in refractive indices for the first and second lens elements of the third optical group respectively.

3. The lens system of claim 1, wherein each of the optical lens elements of the first through fifth optical groups comprise glass material and wherein thermal expansion coefficients of the glass materials of the optical groups and thermal expansion coefficients of mechanical spaces satisfy the relations:

$$1.05 < \alpha_1/\alpha_2 < 1.40,$$

$$1.35 < \alpha_{31}/\alpha_{32} < 1.60,$$

$$0.50 < \alpha_4/\alpha_5 < 0.80, \text{ and}$$

$$0.75 < A/\alpha_s < 1.25,$$

$$A = (\alpha 1 + \alpha 2 + \alpha 3 + \alpha 4 + \alpha 5)/5,$$

where A is the mean value of thermal expansion coefficients of glass materials used in the lens elements, α1 is the thermal expansion coefficient of the first optical group lens element, α2 is the thermal expansion coefficient of the second optical group lens element, α3=α31+α32, α31 is the thermal expansion coefficient of the first lens element of the third optical group, α32 is the thermal expansion coefficient of the second lens element of the third optical group, α4 is the thermal expansion coefficient of the fourth optical group lens element, α5 is the thermal expansion coefficient of the fifth optical group lens element, and αs is the thermal expansion coefficient of the mechanical spacers material between all of the optical groups and between the fifth group and the image plane.

4. The lens system of claim 1, wherein the focus change within a temperature range of −60° C. to +80° C. is less than 0.002 inches.

5. The lens system of claim 1, wherein the optical lens element of the first optical group is a meniscus lens.

6. The lens system of claim 1, wherein the optical lens element of the second optical group is a meniscus lens.

7. The lens system of claim 1, wherein the first lens optical element of the third optical group is a double convex lens.

8. The lens system of claim 1, wherein the second optical lens element of the third optical group is a double concave lens.

9. The lens system of claim 1, wherein the optical lens element of the fourth optical group is a double convex lens.

10. The lens system of to claim 1, wherein the optical lens element of the fifth optical group is a meniscus lens.

11. The lens system of claim 6 wherein an equation of the first surface of the optical lens element of the first optical group is a general asphere.

12. The lens system of claim 11, wherein the optical lens element of the fifth optical group is bent towards the image plane.

13. The lens system of claim 6, wherein the optical lens element of the first optical group is bent towards the object.

14. The lens system of claim 9, wherein the optical lens element of the second optical group is bent towards the object.

15. The lens system of claim 1, wherein each of the optical lens elements of the first through fifth optical groups comprise glass material and no more than five types of optical glasses are used.

16. The lens system of claim 1, wherein distortion induced by the first surfaces of the optical lens elements of the first and second optical groups is compensated by distortion induced by the last surfaces of the optical lens elements of the first and second optical groups, distortion induced by the last surface of the second lens element of the third optical group compensates distortion induced by the first surface of the first optical lens element of the third optical group, distortion induced by the first surface of the optical lens element of the fourth optical group is compensated by distortion induced by the optical lens element of the fifth optical group.

* * * * *